Patented Mar. 14, 1944

2,343,908

UNITED STATES PATENT OFFICE 2,343,908

VITREOUS ENAMELING

Charles J. Kinzie and Donald S. Hake, Niagara Falls, N. Y., assignors to The Titanium Alloy Manufacturing Company, New York, N. Y., a corporation of Maine No Drawing. Original application July 28, 1937, Serial No. 156,137. Divided and this application March 18, 1940, Serial No. 324,736

6 Claims. (Cl. 106—48)

This invention relates to new and improved opacifiers, and to vitreous enamels containing such opacifiers. More particularly, it relates to a new and improved zirconium oxide opacifier.

This application is a division of our copending application Serial No. 156,137, now Patent No. 2,194,426 issued March 19, 1940.

Zirconium oxide has been extensively used as an opacifier in the art of enameling. In one well known procedure a frit formula is prepared and then smelted to a homogeneous melt, whereupon it is poured into water to quench and produce the frit. The frit thus produced is then milled with other enamel ingredients, including an opacifier, to form a slip, which is coated on a suitable base, such as sheet iron, and fired to form an enamel. Both zirconium oxide and tin oxide have been used as opacifiers in these enamels, the latter generally being able to produce the same opacity with slightly smaller quantities than the former. However, due to the relatively higher cost of tin oxide, zirconium oxide has been extensively used in the slightly larger quantities necessary to secure the desired opacity.

In accordance with the present invention it has been discovered that a certain novel zirconium oxide product has produced opacity results which are superior to those secured with tin oxide, even when used in considerably smaller quantities. This product comprises a zirconium oxide of relatively high purity containing adsorbed carbon dioxide or adsorbed carbon in a colorless form which forms carbon dioxide to produce opacity when the enamel is fired.

A zirconium oxide containing adsorbed carbon dioxide suitable for this purpose is that described and claimed in our aforementioned copending application, now Patent No. 2,194,426. This may be described as being a crystalline $ZrO_2$ of high birefringence with an index of refraction higher than that of baddeleyite, namely, above 2.24. The crystals are in the form of thin plates which are longer than wide and also thinner than their width, and whose dimensions are in the range mainly from 1 to 15 microns long, from 0.5 to 8 microns wide, and 0.4 micron to 1 micron thick. This material is additionally characterized as being white of a high order at a magnification of 1370, and having a content of adsorbed $CO_2$ or colorless adsorption compound of a zirconium compound and a carbon compound, the carbon compound being evolved in the form of gaseous carbon gas in contact with a flux. Although the carbon may be present as some other colorless compound of carbon, we are led to believe that it does contain adsorbed $CO_2$ through extensive tests made on the product, as fully described in our aforesaid copending application, now Patent No. 2,194,426. The presence of $CO_2$ may explain the high index of refraction noted for this product, and may also explain the low density (38 and 34½ pounds per cubic foot in two examples) as compared with other zirconium oxide products (170 pounds per cubic foot for electrically fused zirconia, and 145 pounds per cubic foot for the synthetic baddeleyite of U. S. Patent No. 2,072,889). The above density figures are for the products after fine wet milling, which of course is necessary when employing them as enamel opacifiers.

The method of preparing this material and the apparatus used therefor is fully described in our aforesaid copending application, now Patent No. 2,194,426. Basically, it comprises the formation of a zirconium-oxygen-carbon intermediate in the electric furnace, and the subsequent oxidation of this compound in thin layers, such as of the order of $\frac{1}{8}$ inch thick, at a temperature of approximately 900° C. Oxidation in a thick layer does not produce the desired product because of the fact that in a thick mass the temperature becomes so high due to heat given off during oxidation that the properties of the product are altered.

In accordance with the present invention, a zirconium oxide product containing adsorbed $CO_2$ is added to a suitable frit at the mill. When such a product was so added 6% at the mill along with 6% enameler's clay and ¼% of magnesium carbonate, and then milled with water to slip and applied to ground coated iron base and fired, we found that the enamel consisted of a coating considerably increased in thickness due to action of the enamel (which is a powerful flux). Such result was undoubtedly due to the liberation of the adsorbed gas, or to the decomposition of the herein referred to colorless carbon compounds to form colorless gaseous carbon compounds which evolved within the viscous enamel at relatively high temperatures (say 1500° F.), and so are entrapped therein with the formation of a matrix of vitreous enamel in which are a multitude of gas pockets, or perhaps better described as bubbles. We also found that the opacity of this enamel was considerably higher than that of one from the same frit with 6% mill added tin oxide, and that a relatively small percentage of this new zirconium oxide was capable of producing an unheard-of degree of opacity for such small mill addition. To illustrate our discovery we offer the following experiments and tests.

An enamel frit was prepared by mixing a batch of the following ingredients, all parts by weight:

| | |
|---|---|
| Feldspar | 35.72 |
| Quartz powder | 16.00 |
| Borax—hydrated | 32.80 |
| Sodium nitrate | 5.00 |
| Sodium carbonate | 7.57 |
| Cryolite | 6.00 |
| Antimony oxide | 2.70 |
| Fluorspar | 5.00 |
| Zinc oxide | 4.00 |
| Calcium carbonate | 1.54 |
| Titanium oxide | 4.00 |
| Sodium silico fluoride | 4.00 |
| | 124.33 |

This mix was smelted to a homogeneous melt, poured into water to quench and produce the frit, and dried. 100 parts of the above frit, 6 parts of enameler's clay, 0.25 part of magnesium carbonate, and a varying quantity of opacifier were accurately weighed into porcelain jar mills containing porcelain balls. About 40 parts of water were added to each charge, which was then milled to a fineness of 12 grams residue on a 200 mesh sieve from a 100 cc. sample slip. The enameling was done on pieces of sheet enameling iron 6″ x 4″ size first enameled with a dark ground coat on both sides; the cover coat enamel under test was then applied in two coats. The first coat was first dried and fired for 2½ minutes at 1520° F., cooled, and then another coat applied, dried and fired at 1520° F. for 2½ minutes. The cover coat was applied in both coats to one side only of the 6″ x 4″ piece. The total weight of cover coat enamel was kept within the tolerance 11.90 to 12.10 grams per 6″ x 4″ surface. The opacity or reflectance was then determined by means of a reflectance meter.

Except for the kind and amount of the opacifier, all examples were prepared exactly the same. The following table will list the opacifier additions and the reflectance results. Opacifier X is a zirconium oxide containing adsorbed $CO_2$, prepared in accordance with our aforesaid copending application, now Patent No. 2,194,426, and shows the following analysis:

| | Per cent |
|---|---|
| Zirconium oxide ($ZrO_2$) | 97.85 |
| Titanium oxide ($TiO_2$) | 0.10 to nil |
| Silicon oxide ($SiO_2$) | 0.10 to nil |
| Silicon carbide (SiC) | Trace to nil |
| Carbon dioxide ($CO_2$) | 1.64 |
| Iron oxide ($Fe_2O_3$) | 0.01 |
| Others | 0.30 |
| | 100.00 |

Opacifier Y is a typical tin oxide used for opacifying enamels. Opacifier Z is a roasted product prepared according to Example B of U. S. Patent No. 2,102,627.

| Enamel test letter | Parts of and kinds of opacifiers | Reflectance reading of enamel |
|---|---|---|
| A | None | 60.0 |
| B | 0.10 X | 61.6 |
| C | 0.10 Y | 60.2 |
| D | 0.20 X | 63.0 |
| E | 0.30 X | 64.1 |
| F | 0.40 X | 65.2 |
| G | 0.50 X | 66.7 |
| H | 0.50 Y | 61.9 |
| I | 1.00 X | 68.9 |
| J | 2.00 X | 69.3 |
| K | 2.00 Y | 65.8 |
| L | 3.00 X | 71.7 |
| M | 4.00 Y | 69.1 |
| N | 6.00 Y | 72.1 |
| O | 0.10 Z | 60.1 |
| P | 0.50 Z | 61.6 |

Enamel A, as will be observed, contains no mill addition opacifier and has a reflectance of 60. In enamel C, 0.10 part tin oxide has practically no effect in increasing the reflectance, while as noted in enamel H, 0.50 part tin oxide only increased the reflectance from 60 of A to 61.9. On the other hand zirconium oxide containing adsorbed $CO_2$ imparted a regular increase in opacity. Based on these results it may be stated that in these lower percentages the zirconium oxide produces from three to four times as much increase in opacity as does tin oxide. Thus in enamel B, 0.10 part of opacifier X produced practically as much opacity as compared with 0.50 parts tin oxide in enamel H, while 0.20 part of opacifier X in enamel D produced considerably more opacity as compared with the tin oxide of enamel H. Again enamel G, with 0.50 part of this zirconium oxide, has a higher opacity reading than did enamel K containing two parts by weight of tin oxide. Enamels O and P show that a high grade zirconium oxide opacifier, like tin oxide, has none of the properties of the $ZrO_2$ containing adsorbed $CO_2$.

When zirconium oxide containing adsorbed carbon dioxide is used in amounts much above one part by weight to 100 parts by weight of frit, the enamel is definitely expanded and the surface, although having a good lustre, is of a texture entirely different as compared with that of a smooth enamel. The 2 parts and 3 parts by weight addition of opacifier X produced a surface with considerable lustre, but it had a decidedly wrinkled texture. The addition of 1 part of this zirconium oxide produced an enamel of smooth texture, but with somewhat less lustre as compared with enamel A, while 0.50 parts of opacifier X produced an enamel having a good lustre.

As a mill addition opacifier in vitreous enameling, therefore, zirconium oxide containing adsorbed carbon dioxide possesses an opacifying power hitherto unknown, since relatively small amounts added at the mill produce opacity to a degree hitherto unknown for any mill addition material. Where high lustre smooth texture enamels are desired, the amount used should be kept below the point where the texture and lustre are materially affected, namely, in amounts of 1 part or less by weight to 100 parts frit. The textures produced by higher percentages may be of interest as special vitreous enamel finishes.

In the above description and examples, when parts are mentioned, parts by weight are understood.

We claim as our invention:

1. A white vitreous enamel containing as an opaquing agent a minor quantity of a zirconium oxide compound having an adsorbed carbon dioxide content in which carbon dioxide evolved during firing produces opacity.

2. A white vitreous enamel containing as an opaquing agent a minor quantity of a zirconium oxide compound of low density and high purity having an adsorbed carbon dioxide content in which carbon dioxide evolved during firing produces opacity.

3. A white vitreous enamel containing as an opaquing agent 0.1% to 1% of a zirconium oxide compound having an adsorbed carbon dioxide content in which carbon dioxide evolved during firing produces opacity.

4. A white vitreous enamel containing as an opaquing agent 0.1% to 1% of a zirconium oxide compound of low density and high purity having an adsorbed carbon dioxide content in which carbon dioxide evolved during firing produces opacity.

5. A method of forming white opaque enamels comprising milling a frit with water and a minor quantity of an opaquing agent comprising a zirconium oxide compound of low density and high purity having an adsorbed carbon dioxide content, applying the milled slip thus formed to a base, drying, and firing at such a temperature as to cause said opaquing agent to react with the remaining enamel ingredients and form minute bubbles of carbon dioxide throughout said enamel.

6. A method of forming white opaque enamels comprising milling a frit with water and 0.1% to 1%, based on the weight of the frit, of an opaquing agent comprising a zirconium oxide compound of low density and high purity having an adsorbed carbon dioxide content, applying the milled slip thus formed to a base, drying, and firing at such a temperature as to cause said opaquing agent to react with the remaining enamel ingredients and form minute bubbles of carbon dioxide throughout said enamel.

CHARLES J. KINZIE.
DONALD S. HAKE.